(12) United States Patent
Sama (10) Patent No.: US 8,974,278 B2
(45) Date of Patent: Mar. 10, 2015

(54) INTERNET / TELEVISION GAME SHOW (76) Inventor: Pat Sama, White Plains, NY (US)

( * ) Notice: Subject to any disclaimer, the term of this patent is extended or adjusted under 35 U.S.C. 154(b) by 0 days.

(21) Appl. No.: 13/008,804

(22) Filed: Jan. 18, 2011

(65) Prior Publication Data

US 2011/0237318 A1 Sep. 29, 2011

Related U.S. Application Data

(60) Provisional application No. 61/336,017, filed on Jan. 15, 2010.

(51) Int. Cl.

| *A63F 13/12* | (2006.01) |
|---|---|
| *A63F 13/30* | (2014.01) |
| *G07F 17/32* | (2006.01) |
| *A63F 9/18* | (2006.01) |
| *A63F 11/00* | (2006.01) |

(52) U.S. Cl.
CPC ............ *A63F 13/12* (2013.01); *G07F 17/3225* (2013.01); *A63F 9/183* (2013.01); *A63F 2011/0097* (2013.01); *A63F 2300/1093* (2013.01); *A63F 2300/407* (2013.01); *A63F 2300/409* (2013.01); *A63F 2300/8064* (2013.01)
USPC ................................................. 463/9; 463/42

(58) Field of Classification Search
CPC .......... H04N 21/8173; H04N 21/4781; H04N 21/21805; H04N 21/2187; A63F 2300/8064; A63F 2300/69; A63F 2300/695; A63F 2300/5553; A63F 2300/301; A63F 2300/303; A63F 2300/307; A63F 2300/308; A63F 2300/1087; A63F 2300/1093; A63F 2300/40; A63F 2009/2435; A63F 2009/186; A63F 2009/188; A63F 9/18; A63F 9/183; A63F 2011/0097; A63F 2300/407; A63F 2300/409; G07F 17/3225

USPC ...................... 463/9, 30, 31, 40–42; 705/319; 715/758; 348/14.08, 14.09, 14.1; 725/133, 141, 153, 9, 10, 11, 23, 24, 725/64, 105, 106, 109
See application file for complete search history.

(56) References Cited

U.S. PATENT DOCUMENTS

| 4,876,592 | A | * | 10/1989 | Von Kohorn | 725/23 |
|---|---|---|---|---|---|
| 4,926,255 | A | * | 5/1990 | Von Kohorn | 725/23 |
| 5,508,731 | A | * | 4/1996 | Kohorn | 725/24 |
| 5,695,400 | A | * | 12/1997 | Fennell et al. | 463/42 |
| 5,697,844 | A | * | 12/1997 | Von Kohorn | 463/40 |
| 5,916,024 | A | * | 6/1999 | Von Kohorn | 463/40 |
| 6,439,997 | B1 | | 8/2002 | Brasseur | |
| 6,443,840 | B2 | * | 9/2002 | Von Kohorn | 463/17 |
| 6,800,031 | B2 | | 10/2004 | Di Cesare | |
| 6,860,810 | B2 | * | 3/2005 | Cannon et al. | 463/20 |
| 6,999,083 | B2 | * | 2/2006 | Wong et al. | 345/473 |
| 7,137,892 | B2 | * | 11/2006 | Sitrick | 463/31 |
| 7,192,351 | B2 | * | 3/2007 | Rozkin et al. | 463/40 |
| 7,351,149 | B1 | | 4/2008 | Simon | |

(Continued)

*Primary Examiner* — David L Lewis
*Assistant Examiner* — Matthew D Hoel
(74) *Attorney, Agent, or Firm* — Lyman H. Smith (57) ABSTRACT

A game show may be played online or may be played online while being simultaneously broadcast on television. The contestants of the game show are internet users who may use a web camera to connect to the online game. The host of the game show may be transmitted to the online game as well as to the television audience. A web-only (non-televised) based game may be used to get qualifying contestants to play in the online/televised game. The object of the game is to be the "last cam standing" by, for example, answering trivia questions correctly and eliminating other players.

13 Claims, 13 Drawing Sheets

(56) References Cited

U.S. PATENT DOCUMENTS

| | | | |
|---|---|---|---|
| 7,446,772 B2* | 11/2008 | Wong et al. | 345/473 |
| 7,458,894 B2* | 12/2008 | Danieli et al. | 463/42 |
| 7,727,060 B2 | 6/2010 | Mills | |
| 8,025,572 B2* | 9/2011 | Spanton et al. | 463/42 |
| 2001/0036865 A1* | 11/2001 | Neal, III | 463/42 |
| 2002/0034980 A1 | 3/2002 | Lemmons | |
| 2002/0108125 A1* | 8/2002 | Joao | 725/139 |
| 2002/0183105 A1* | 12/2002 | Cannon et al. | 463/16 |
| 2002/0196746 A1* | 12/2002 | Allen | 370/260 |
| 2003/0003990 A1* | 1/2003 | Von Kohorn | 463/25 |
| 2003/0186745 A1 | 10/2003 | Nguyen | |
| 2004/0248652 A1* | 12/2004 | Massey et al. | 463/42 |
| 2005/0144024 A1* | 6/2005 | Wojton et al. | 705/1 |
| 2006/0112325 A1* | 5/2006 | Ducheneaut et al. | 715/500.1 |
| 2006/0258446 A1* | 11/2006 | Nguyen et al. | 463/30 |
| 2008/0188290 A1* | 8/2008 | MacGuire | 463/22 |
| 2008/0200247 A1* | 8/2008 | Yoshizawa | 463/31 |
| 2008/0242423 A1 | 10/2008 | Kerr | |
| 2009/0005141 A1 | 1/2009 | Lehtiniemi | |
| 2009/0075738 A1* | 3/2009 | Pearce | 463/42 |
| 2009/0325711 A1 | 12/2009 | Bronstein | |
| 2010/0083324 A1* | 4/2010 | Smith et al. | 725/109 |

\* cited by examiner

INTERNET / TELEVISION GAME SHOW

CROSS-REFERENCE TO RELATED APPLICATIONS

This application claims the benefit of priority of U.S. Provisional patent application No. 61/336,017, filed Jan. 15, 2010, which is herein incorporated by reference.

BACKGROUND OF THE INVENTION

The present invention relates to a game show and, more particularly, to a game show that may be played online or simultaneously online and on television, where the contestants are internet users.

Game shows require the contestants to report to the game show's studio to play the game. Often, the studios are not local to the contestants and travel must be arranged, often at the contestant's own cost.

Internet games are available to online users. Typically, these games are played against the computer (or virtual players) or against other players who are identified by a player name and/or an icon, such as an avatar. The players, however, are not visible to each other and the games are not regulated (for example, by a host) to ensure a smooth game. Further, there is no means available for the online games to be broadcast to a "studio audience", for example, to be viewed on television and online simultaneously.

As can be seen, there is a need for game show that may be played online or simultaneously online and on television, where the contestants are internet users visible to one another.

SUMMARY OF THE INVENTION

In one aspect of the present invention, a game comprises at least one player positioned at respective player's computers; each player having a web camera for transmitting video (which may or may not be streaming) to a game running computer, wherein the game running computer is adapted to receive the images from each player's web camera, transmit back an output video (which may or may not be streaming) to each player, where the output video incorporates a game play area which includes the transmitted video (which may or may not be streaming) from each player's web camera and an interaction area for receiving and answering questions.

In another aspect of the present invention, a computer-readable medium containing programmable code for implementing a method, wherein the method comprises permitting one or more players to join into a game; arranging and displaying all of the players on a game play area to each of the players; choosing two players randomly and displaying web camera images of the two players in a chosen player gamespace; asking the players a question; and awarding points, which may or may not be of monetary value, for the player that answers the question correctly or allocating a strike to the player that answers the question incorrectly.

In a further aspect of the present invention, a method for playing a game comprises permitting one or more players to join into a game; arranging and displaying all of the players on a game play area to each of the players; choosing two players randomly and displaying web camera images of the two players in a chosen player gamespace; asking the players a question; and awarding points, which may or may not be of monetary value, for the player that answers the question correctly or allocating a strike to the player that answers the question incorrectly.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a game show that may be played online or may be played online while being simultaneously broadcast on television. The contestants of the game show are internet users who may use a web cam to connect to the online game. The host of the game show may be transmitted to the online game as well as to the television audience. This video may or may not be streaming video. A web-only based game (non-televised) may be used to get qualifying contestants to play in the online and televised game. The object of the game is to be the "last cam standing" by, for example, answering trivia questions correctly and eliminating other players. In some embodiments of the present invention, a game show may include one or more virtual players and one or more live players. The live players may be able to view the virtual players (online players) and the virtual player (online players) may be able to view the live players during game play. For example, the game board, as described below, may be visible to the live player(s) and each of the virtual players (online players). In addition, video of the live player(s) may be transferred to the virtual player(s) (online players). The game show may be a trivia-style game show.

Figure 1:
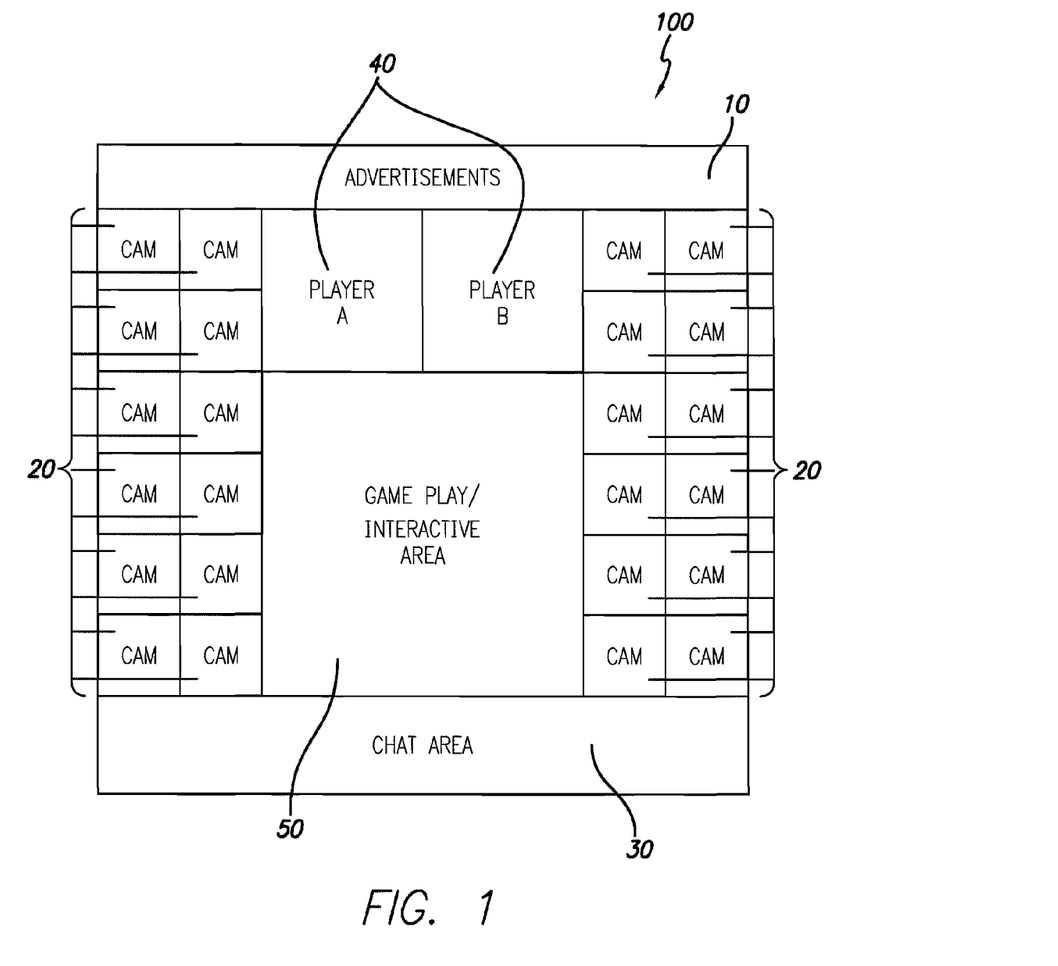
FIG. 1 is a screen image of a game according to an embodiment of the present invention.

Referring to FIG. 1, a game show may be an internet/computer based game operated by software. The software may control the layout of the game play area, as described below, may control the flow of the game, may display and change advertisements, and the like. Users may access the software via a website and/or a downloadable application via a machine readable medium configured to cause the machine to execute the application/software in order to play the game. The software may receive, organize and display multiple web camera video transmissions (which may or may not be streaming) from a plurality of contestants.

A game play area 100 may include a plurality of player areas 20. Each player area 20 may indicate whether the area is available for a player to join a new game, whether the player area 20 is not available (for example, a player has been eliminated and the game is still in progress), or whether a player is currently playing in the game (where the player's web camera video is transmitted (which may or may not be streaming) in at least a portion of that player's player area 20). Alternatively, the player area 20 may include, in place of transmitted video from the player's web camera, an avatar or other selected image to represent the player. In this case, when the player is selected to compete with another player (as described below), these two player's web cameras may activate to transmit web camera images of the players as they are competing.

As shown in FIG. 1, twenty-four player areas 20 may allow up to twenty-four players to join into a game. However, the software may allow a greater or a fewer number of players to play in the same game. In some embodiments of the present invention, two players (from the player area 20) may be randomly chosen to compete. These two chosen players appear in a chosen player gamespace 40. In some embodiments, the web cameras of all players in the player areas 20 may be active at the same time, during the entire game. In other embodiments, only the two chosen players appearing in the chosen player gamespace 40 may be active. In some embodiments, sound may be broadcast in addition to the player's video. In some embodiments, the players may play via a keyboard and/mouse. In some embodiments, the players may play without a web camera. In these embodiments, the players may be able to upload an image or avatar which may or may not be animated.

A host may appear in an interactive area 50 of the game play area 100. The host may be a live person or may be computer generated. The host may regulate the game play, describe the players, ask/display questions, answer disputes, and the like. In some embodiments, the host may include both audio and video that is transmitted (which may or may not be streaming) to all of the players and, when the game is televised (or streamed via some other medium), to the non-playing audience.

Advertisements 10 may appear around the boarder of the game play area 100. For example, advertisements 10 may appear on the top of the game play area 100 as shown in FIG. 1. In other embodiments, advertisements may appear on the sides of the game play area 100. The advertisements 10 may change with each question/game round or at some other interval. The advertisements 10 may provide special deals to contestants of the game if clicked on during game play.

A player chat area 30 may appear in the game play area 100. The player chat area 30 may be an optional feature that may be turned on or off through the software. The player chat area 30 may allow the players to send messages to one another. In some embodiments, the player chat area 30 may or may not be visible to the television and or online audience. In some embodiments, the player chat area 30 may or may not be visible to all of the players, for example, the two chosen players that appear in a player gamespace 40 may not be able to view the player chat area 30. In other embodiments, the online audience may or may not be able to interact in the chat area as to talk to the players.

The online audience may include those players not participating in the game. As discussed above, the online audience may be able to watch the game as it is played and may or may not be able to chat to one another and to the players participating in the game by typing in the chat area window. In some embodiments, the online audience may be used to replace the current players of the game as they are eliminated.

In some embodiments, the players may be given the opportunity to play the game privately. In this situation, the online audience may not be permitted to view the game play.

Statistics may be kept on each player's game play. The statistics may include elements such as the number of games played, the number of televised games played, total points won, percentage of questions answered correctly, percentage of questions answered incorrectly, percentage of questions not answered, and the like. Each player's statistics may or may not be viewable to other players and/or the online audience. In some embodiments, the host may relay the statistics to the audience, be it an online and/or a television audience. For example, the host may comment, "Player One has only answered one question correctly in the past 20 in the category of sports."

Figure 2:
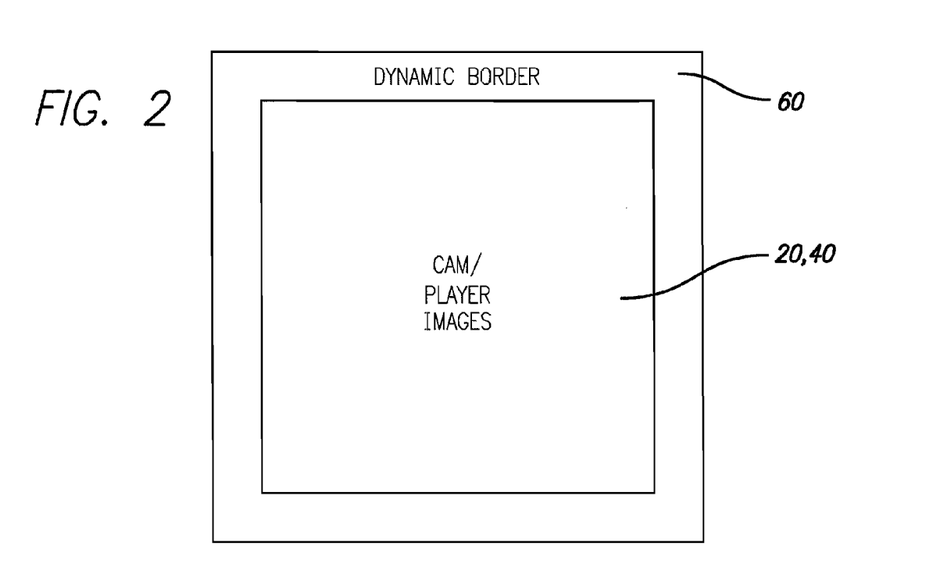
FIG. 2 is a close-up view of player image according to an embodiment of the present invention.

As shown in FIG. 2, the player area 20 (from FIG. 1) and the chosen player gamespace 40 (from FIG. 1) may include a dynamic boarder 60. The dynamic boarder 40 may surround the web camera video feed of the player and may, for example, light up and/or flash when the player is chosen to compete (as described in greater detail below). When a new player is to be chosen to play (and their video transmitted in the chosen player gamespace 40), the dynamic boarders 60 of each player area 20 may light up and/or flash randomly until the flashing/lighting stops on the chosen player. This flashing/lighting up of the cam borders may or may not consist of multiple instances of different colored lights. The dynamic boarder 60 may also be used to display various details of a player, such as the player's name, the number of strikes against the player (as discussed below), a point value, which may or may not be of monetary value, won by the player and the like.

The game may be played on the internet only or may be transmitted to other media, such as on television. Televised games may be broadcast over cable, public and/or private channels. The broadcast may be live or may be pre-recorded.

The game may be played by the contestants answering trivia questions correctly and eliminating other players while the contestant avoids getting eliminated themselves until there is only one player remaining—the last cam standing. The last cam standing (the last player) may then decide whether or not to answer a bonus question, where the player may win or lose everything.

The game may be played as described in greater detail below. Variations to the game play, as described herewithin, may be within the scope of the present invention.

A plurality of players may be permitted to join into the game. These players may be invited to play at a designated time, or may sign up for an ad hoc game. Typically, televised games may invite players to sign-in at a designated time. These players, in the televised games, may be chosen via various means, such as by playing and winning previously played non-televised games. For ad-hoc games, a sign-in period may be designated to permit players to sign-in for a given game. For example, a sign-in period may run from 7 pm through 8 pm for a 8 pm start game. As discussed above, up to twenty-four players may join in a single game. However the game may allow for fewer or greater number of players.

Once the players are signed into the game, two players may be randomly selected to start the game. These two players web camera's video feed may be displayed in the chosen player gamespace 40. A multiple choice answer trivia question may be asked of these two players. Other forms of questions may be asked, such as problem solving, memory, word, strategy, or the like. The games may be centered around one type of question (such as trivia), one class of question (such as sports trivia), or may be random, involving not only trivia questions, but also problem solving, memory, and other types of questions.

The first player to "buzz in" after the answers to the questions have been read (for example, by the host) may be allowed to answer the question. The player may buzz in by, for example, hitting a key on the keyboard or clicking the mouse. In some embodiments, the player may buzz in by clicking on a button within the game play area 100 in order to answer a question. The player may answer by typing the key corresponding to the selected answer, clicking the mouse on a designated area within the game, or may answer by speaking the correct answer into a microphone connected to the player's computer A jackpot may be included in the game, where the jackpot may increase with each correctly answered question. The Jackpot may also increase as players get eliminated and any prize amount that they may have won gets added to the jackpot. In some embodiments, the values for the questions may increase as the game progresses. In addition, as the game progresses, the questions may become more difficult.

If the player answers correctly, they may win a predetermined number of points, which may or may not be of monetary value. That same amount may also get added to the jackpot. The opponent may then get a strike (and, an X may appear, for example, in the dynamic boarder 60 for that player's player area 20 and/or 40) and may get placed back into the player pool. A new opponent for the correctly answering player may then be chosen. The losing opponent may or may not be included in the player pool for selecting a player for the next round. In some embodiments, if the player answers correctly, the opponent may not receive a strike and, instead, may only be returned for another round of play.

If the player buzzing in first answers incorrectly, they may get a strike (and, an X may appear, for example, in the dynamic boarder 60 for that player's player area 20 and/or 40) and may get placed back into the player pool, giving the opponent an opportunity to answer the question. The opponent may be given the opportunity to decline to answer, avoiding the possibility of getting a strike. In this case, the opponent may return to the player pool and two contestants may be chosen for the next round.

If the opponent answers incorrectly, they may get a strike (and, an X may appear, for example, in the dynamic boarder 60 for that player's player area 20 and/or 40) and may get placed back into the player pool and two new players may be chosen for the next round of play. If the opponent answers correctly, they may get the points (which may or may not be of monetary value) associated with that question, the jackpot may increase, and a new opponent may be chosen for the correctly answering player. In some embodiments, however, if a player answers correctly without buzzing in first (because the player to buzz in first answered incorrectly), they receive the points (which may or may not be of monetary value) but may be returned to the player pool (instead of staying for the next round of play) and two contestants may be chosen at random. If the opponent answers incorrectly, they may get a strike and two new contestants may be chosen for the next round at random.

Once a player reaches a predetermined number of strikes, for example, three strikes, they may be eliminated from the game. Any winnings earned by that player may either be lost or may go into the jackpot for that game.

In some embodiments, if the player answers the question correctly and was the first one to buzz in, the opponent player may get a strike. In some embodiments, if the player to buzz in first answers correctly, they may remain in the chosen player gamespace 40 to await a new contestant.

As the game unfolds, players may earn points, which may or may not be of monetary value, the jackpot may increase, and players may get eliminated until there is just one remaining—the last cam standing. This final player may get to play in a bonus round, where they may be given the opportunity to win not only their earned points, but also the jackpot. The final player may have the opportunity to walk away with just their earned points, which may or may not be of monetary value, as, if the final player chooses to play in the bonus round and is not successful, the final player may lose not only the jackpot, but also their earned points, which may or may not be of monetary value. The jackpot, when it is not won, may reset with each game, or a portion of the jackpot (or all of the jackpot) may roll over to the next game, typically to the next televised game.

While the above description refers to players competing one-on-one against each other, the players may or may not be formed into teams to play against each other. These teams, when used, may consist of two or more players. The teams may compete against each other until one team remains. In some embodiments, the points won by the winning team may be split among the team members. In some embodiments, the points split may be distributed evenly. In other embodiments, the points split may be spilt determined on each player's level of play (for example, the percentage of correctly answered questions). In some embodiments, the winning team may split up to compete against each other until there is one person remaining. The teams, when used, may be predetermined teams (determined by players signing up as a team, or determined ahead of time by random draw) or may be randomly determined by the game at the time of play.

FIGS. 4A through 4K show a flow chart describing one embodiment of the flow of the game. As discussed above, variations on this particular embodiment may be envisioned as part of the present invention.

Figure 3:
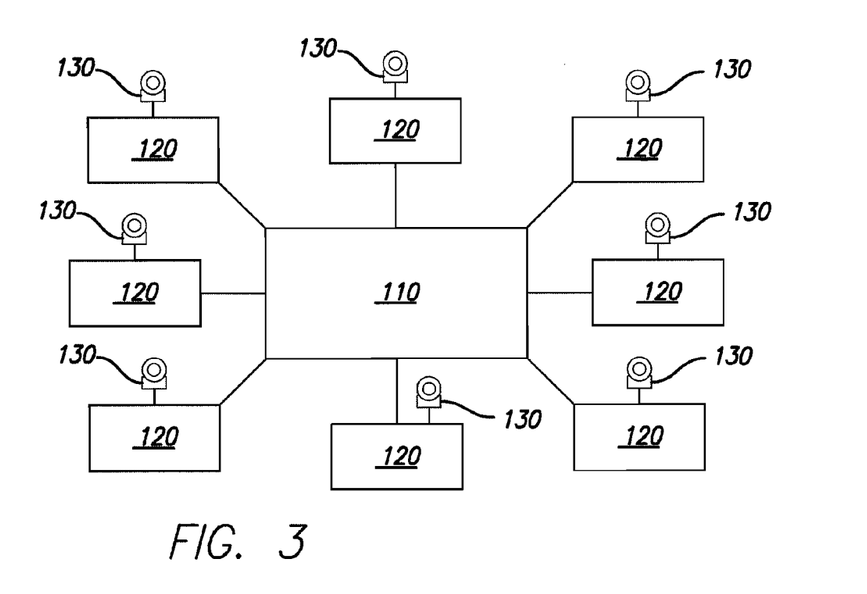
FIG. 3 is a schematic view of a gaming system according to an embodiment of the present invention.
Figure 4A:
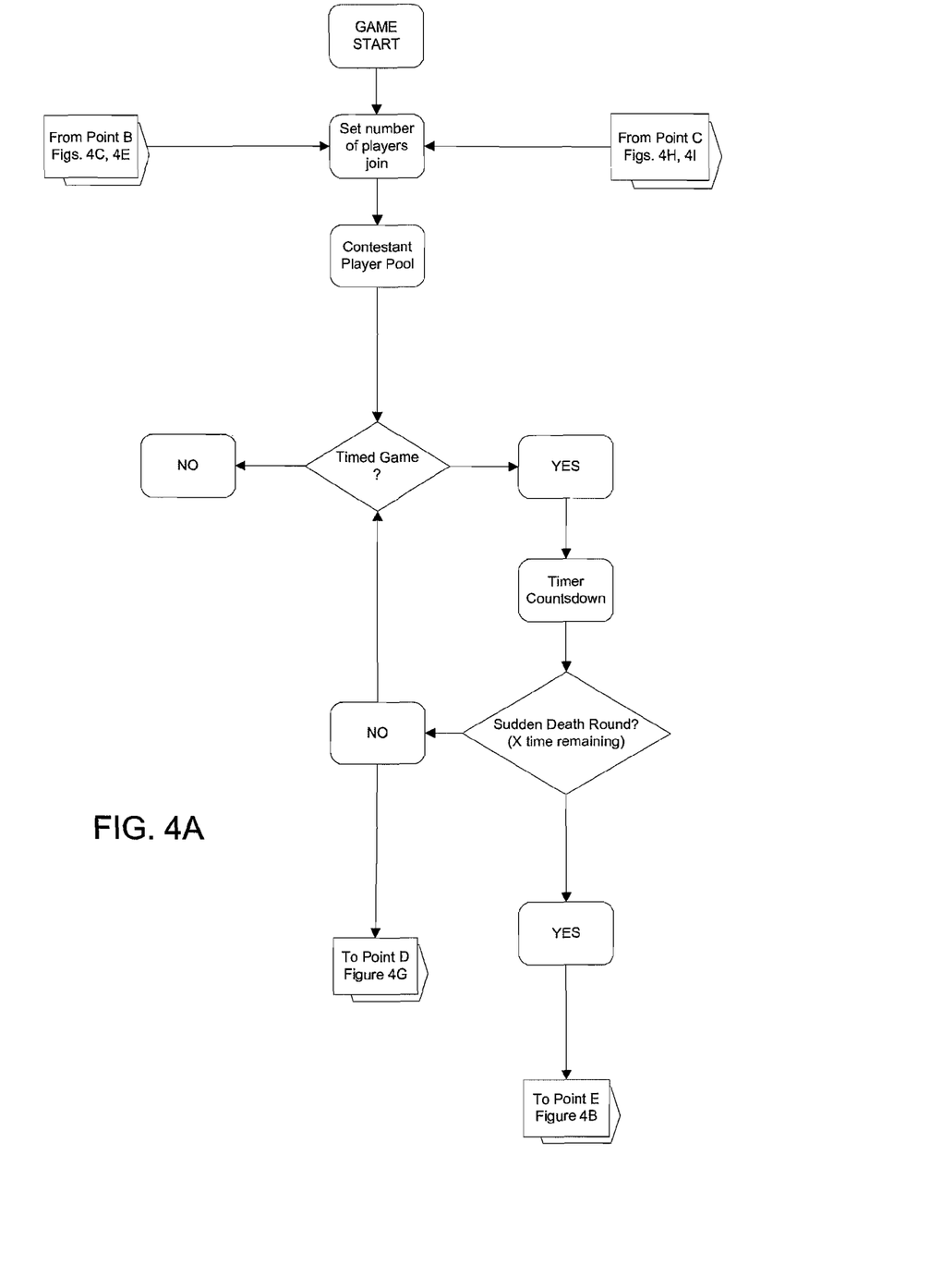
FIGS. 4A through 4K show a flow chart describing a game according to an embodiment of the present invention.
Figure 4B:
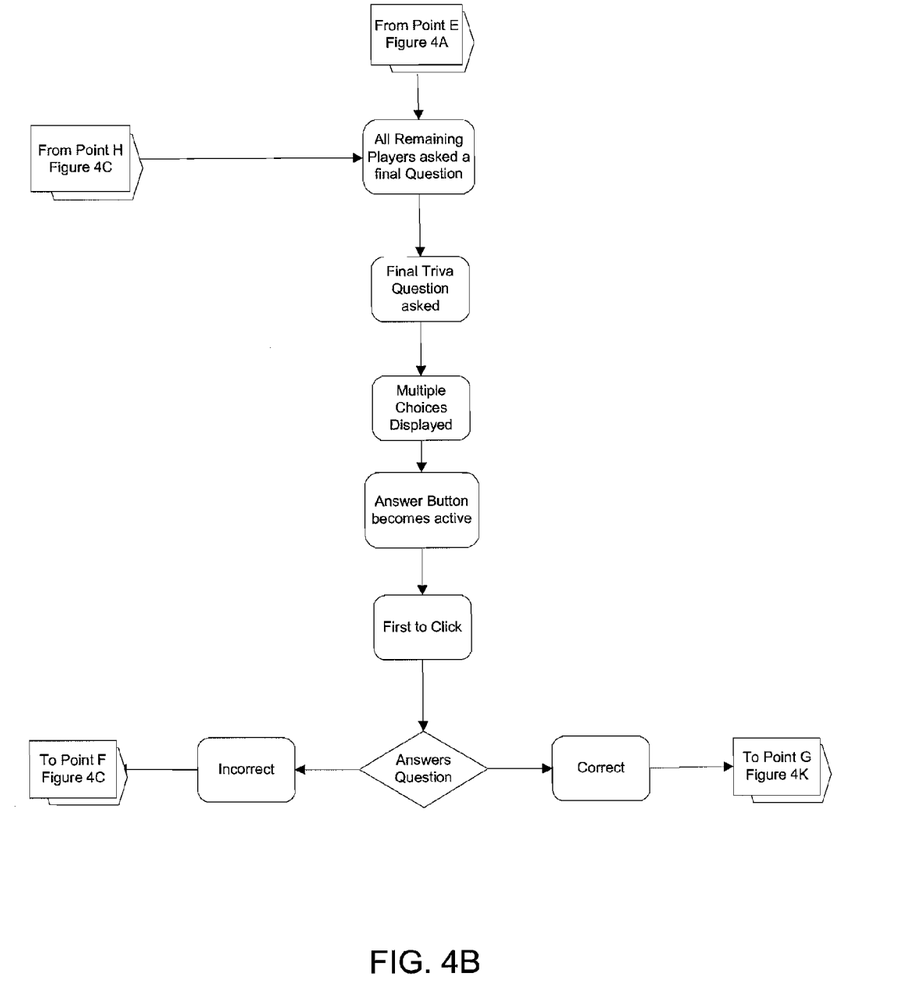
Figure 4C:
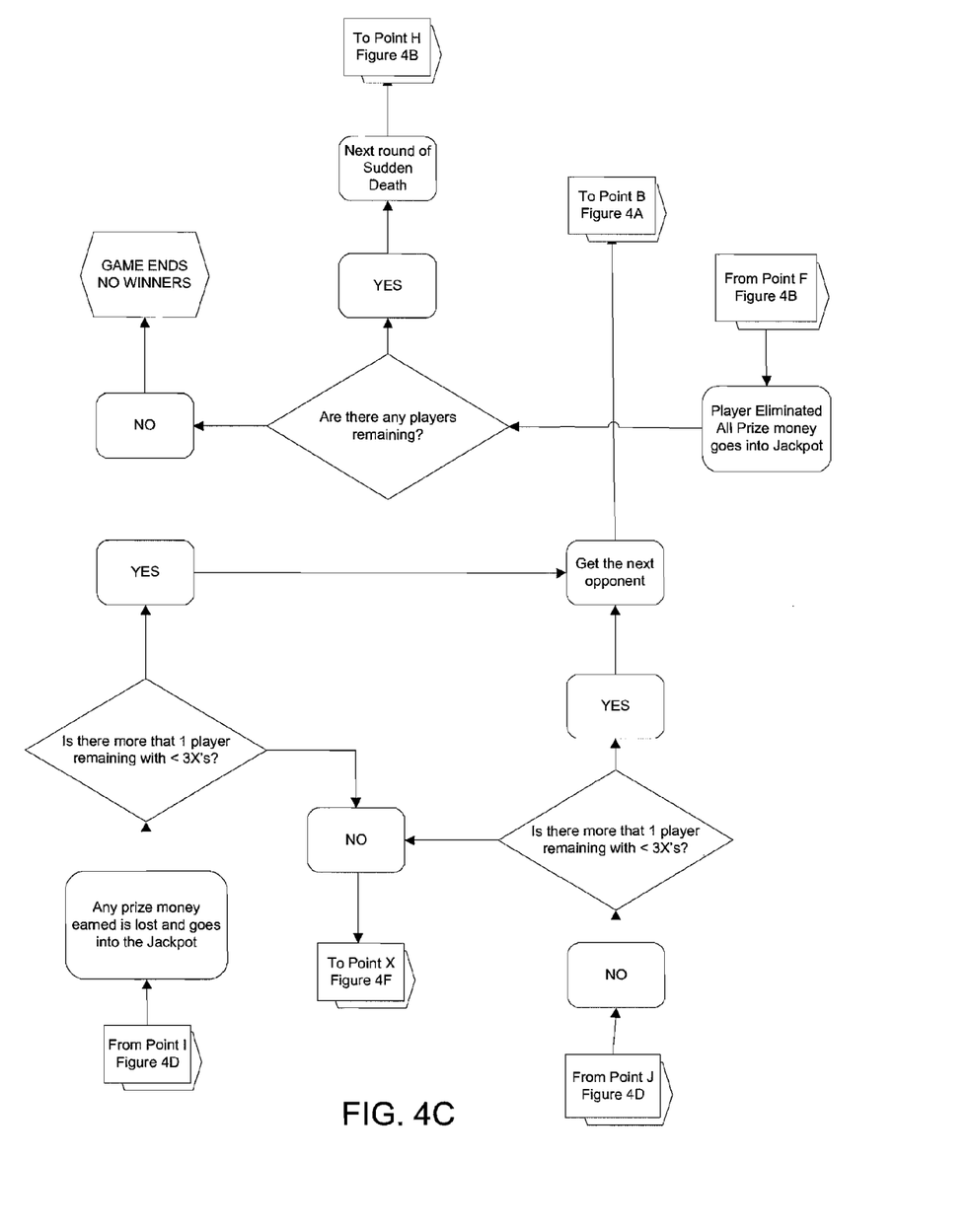
Figure 4D:
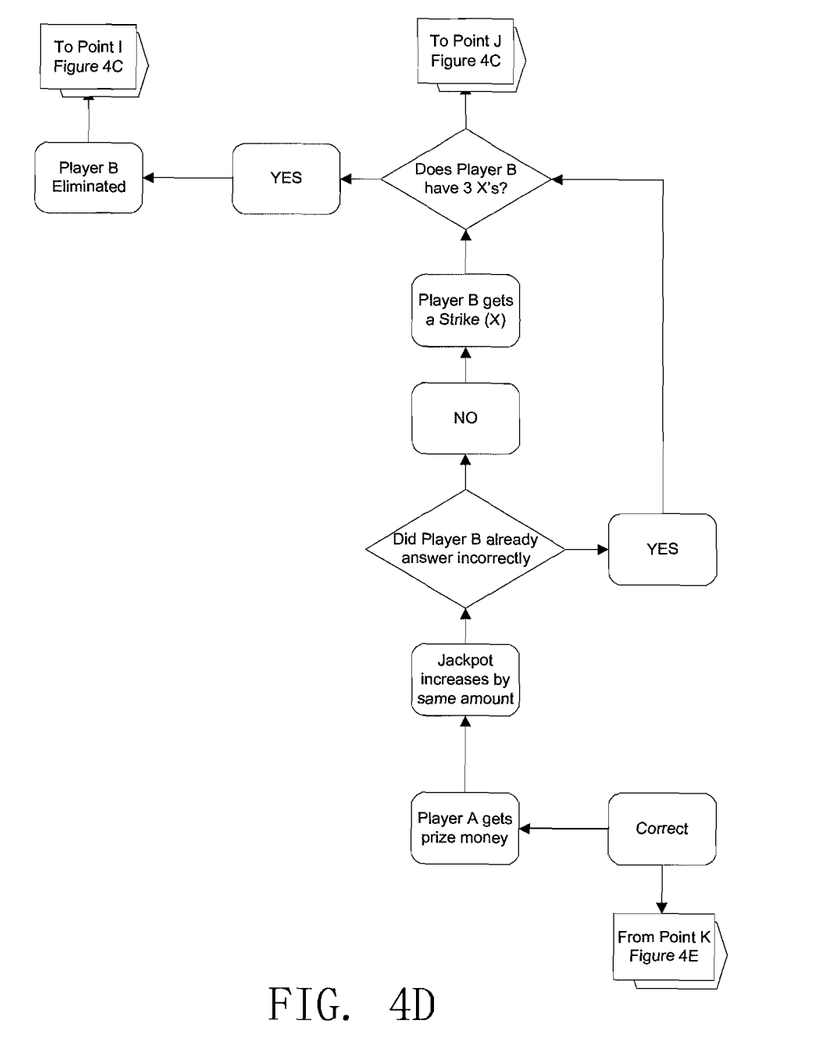
Figure 4E:
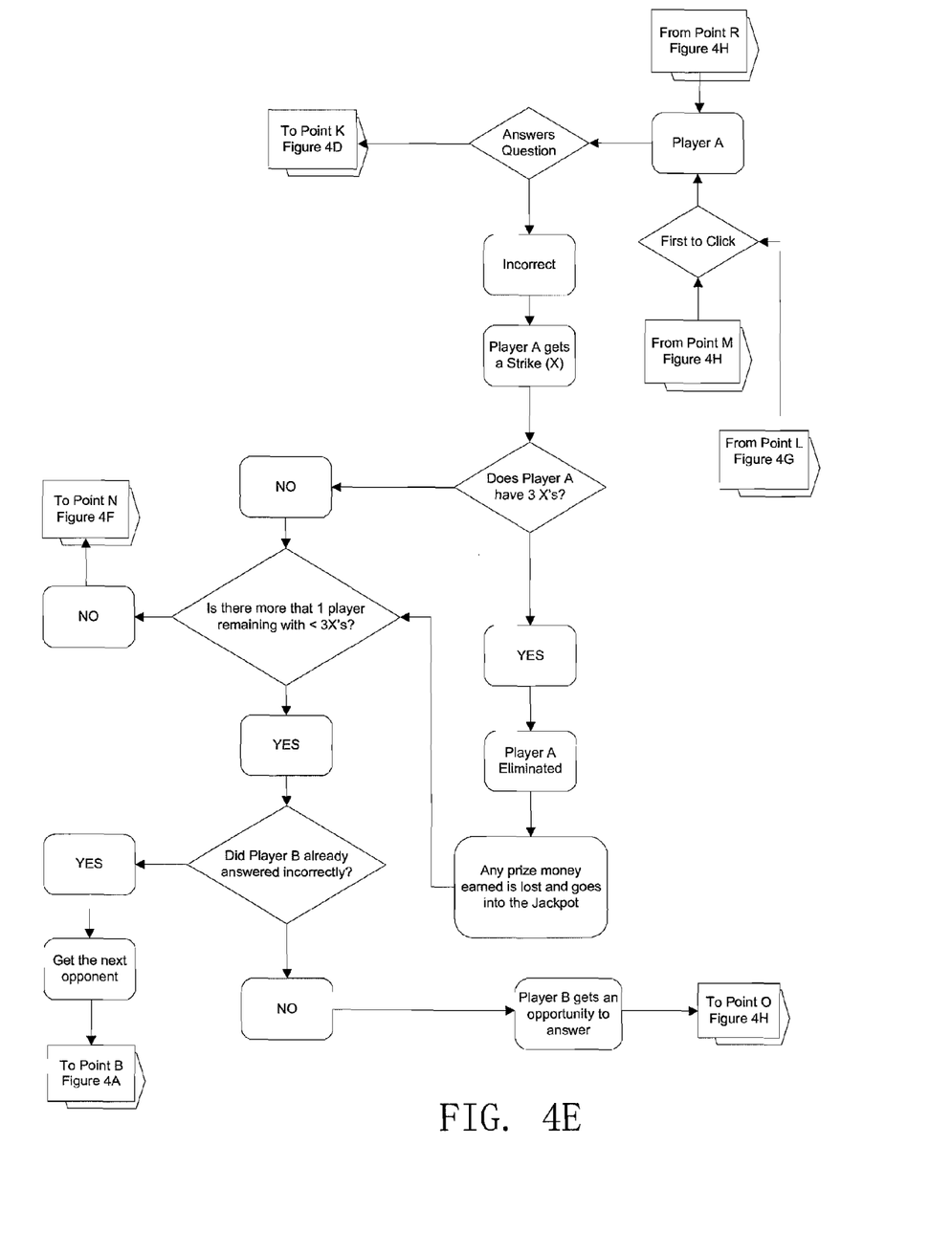
Figure 4F:
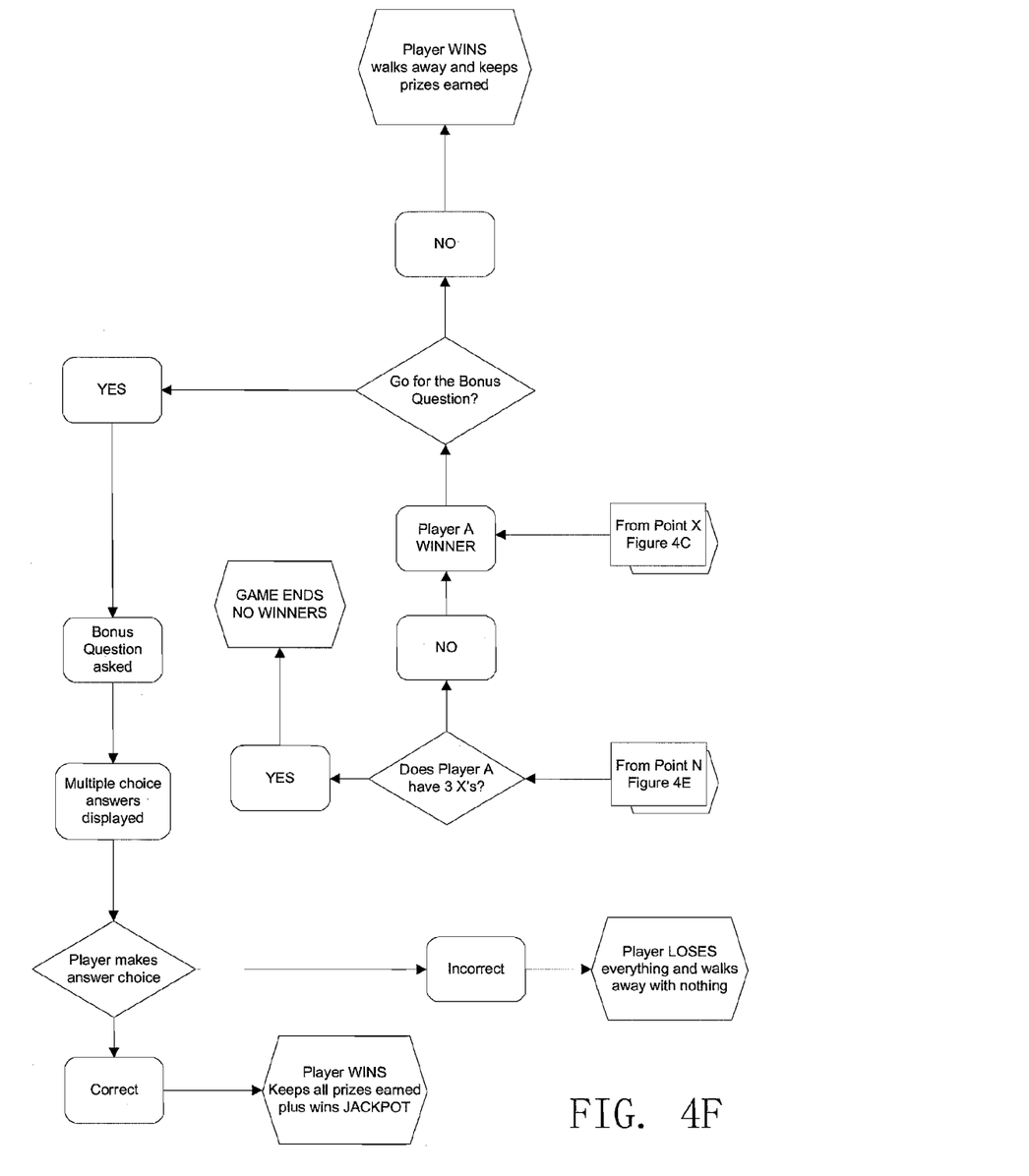
Figure 4G:
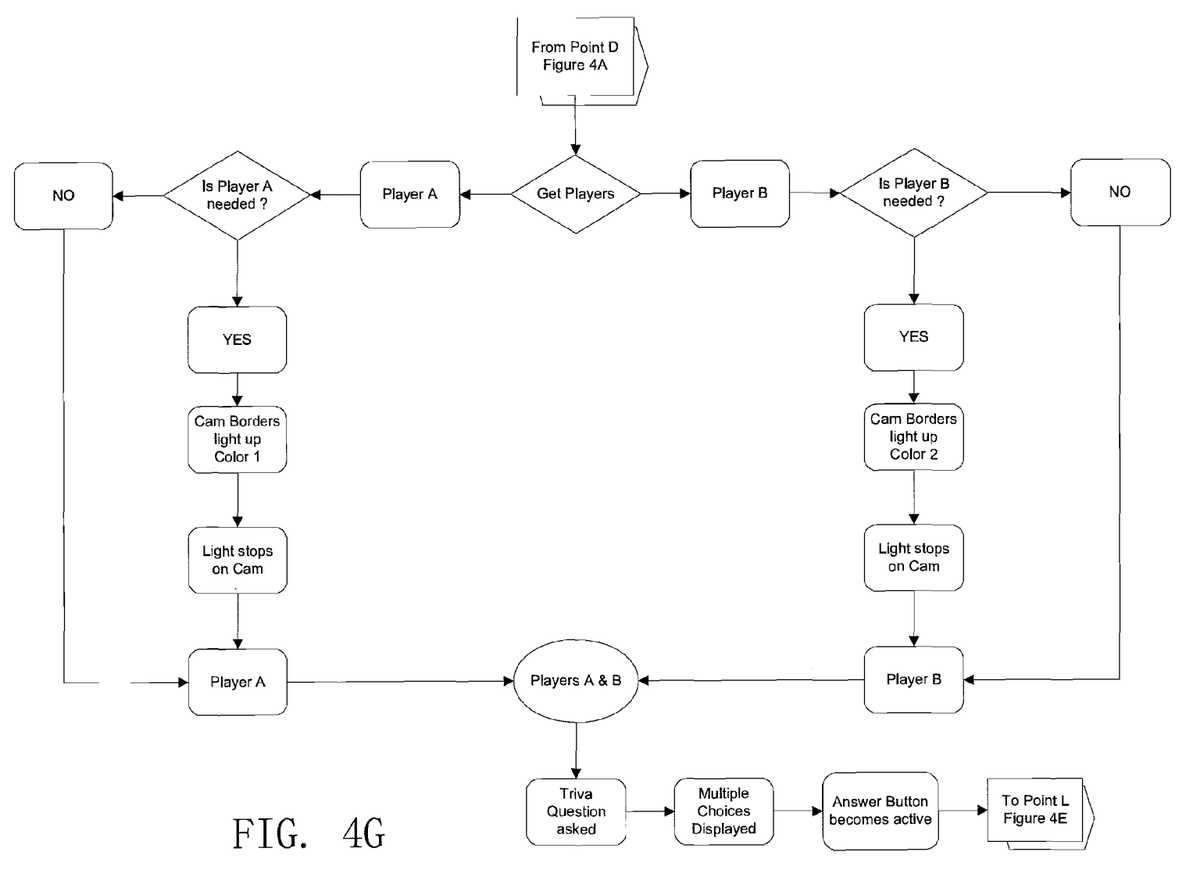
Figure 4H:
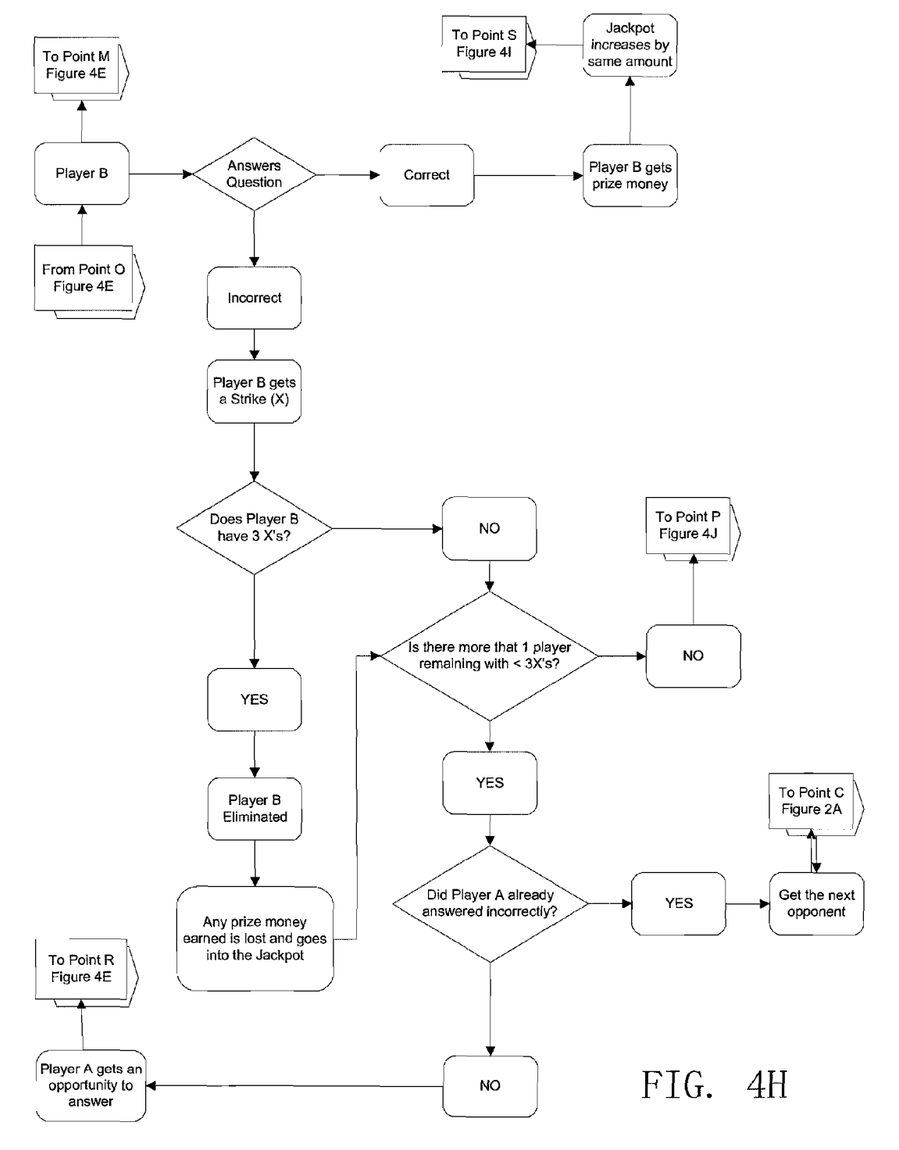
Figure 4I:
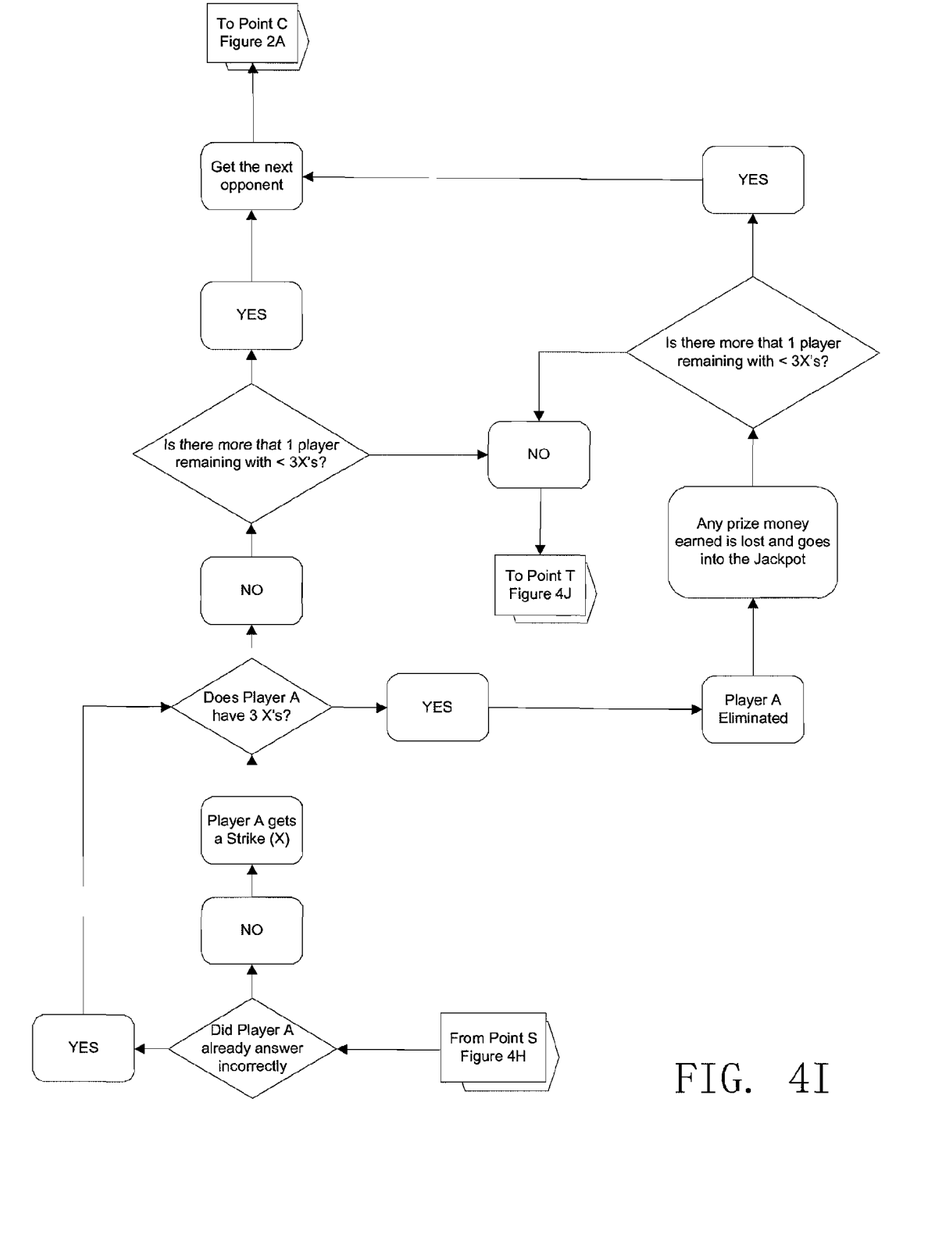
Figure 4J:
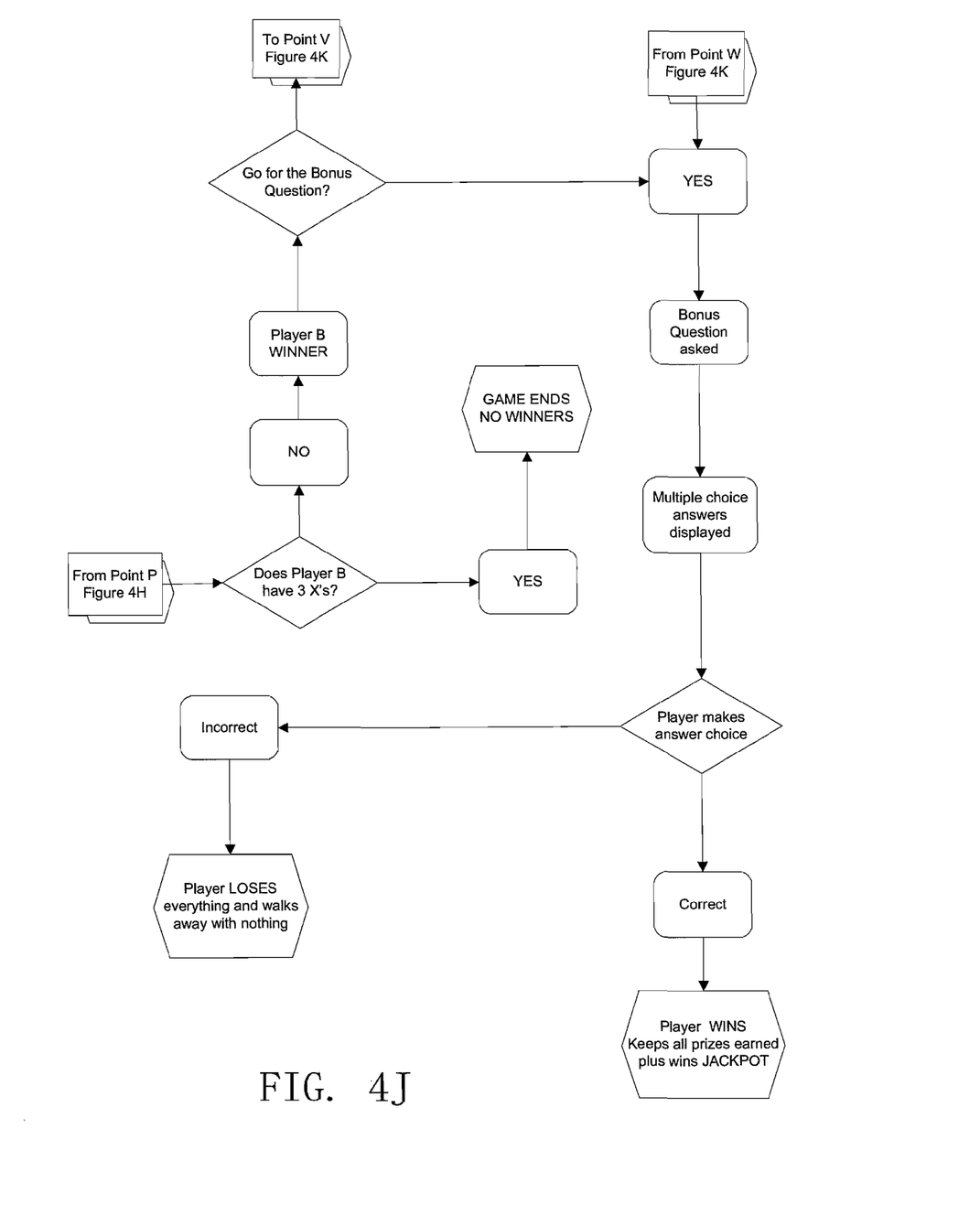
Figure 4K:
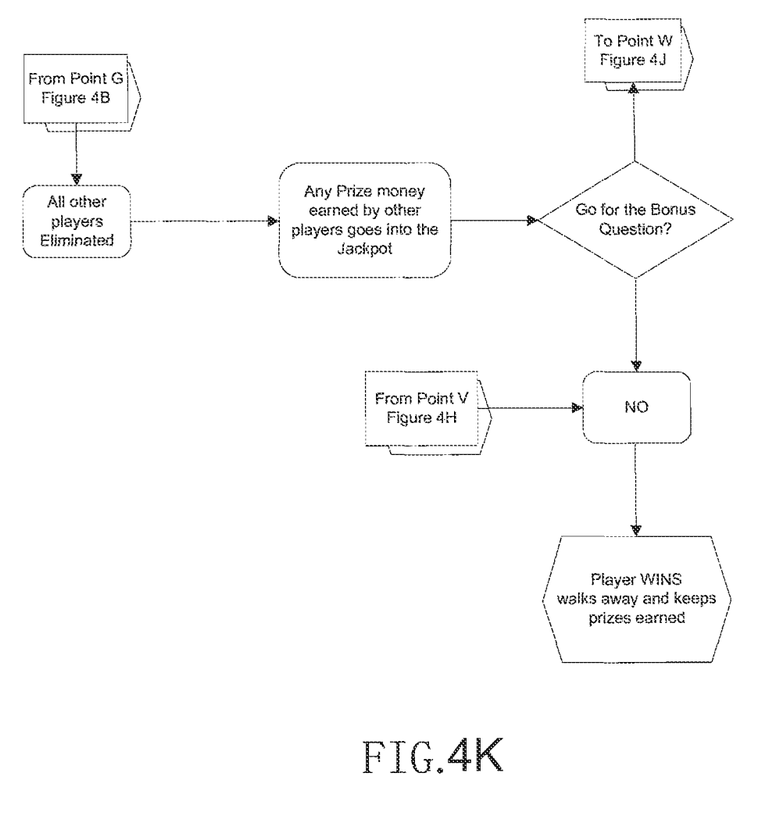

As discussed above, the game may be controlled by software residing on a game running computer 110. The software, or some version thereof, may also reside on player's computers 120. Each of the player's computers 120 may be configured with a web camera 130. The player's computers 120 may communicate with the game running computer 110 via an internet connection, for example. Other methods of communication between the player's computers 120 and the game running computer 110 may include wired or wireless data communication, LAN, WAN, or the like.

It should be understood, of course, that the foregoing relates to exemplary embodiments of the invention and that modifications may be made without departing from the spirit and scope of the invention as set forth in the following claims.

What is claimed is:

1. A game played between players over the internet, the game comprising:
   at least two players positioned at respective player's computers;
   each player having a web camera for transmitting video to a game running computer, wherein
   the game running computer is adapted to receive the transmitted video from each player's web camera and transmit an output video to each player, the output video including a game play area including the transmitted video from each player's web camera and an interaction area for receiving and answering questions posed to an initial two randomly selected players from the at least two players;
   the output video is broadcast, either live or as a pre-recorded output, to a television audience; and
   the initial two randomly selected players compete against each other until a first round is complete and a winner of the first round is determined.

2. The game of claim 1, further comprising a host appearing in the interaction area, the host adapted to control the flow of the game.

3. The game of claim 1, further comprising a chosen player gamespace where players are chosen to compete in a round of the game.

4. The game of claim 1, wherein the transmitted video from each player's web camera in the output video includes a dynamic boarder, the dynamic boarder adapted to flash, light up, or display additional information about the player.

5. The game of claim 1, further comprising advertisements displaying on each of the player's computer.

6. The game of claim 1, further comprising a chat area adapted to permit the players to chat with each other.

7. The game of claim 1, further comprising a computer-readable medium containing programmable code for implementing a method for controlling the game.

8. A method for playing an interactive trivia game on a computing device equipped with a web camera and connected to the internet, the method comprising:
   permitting two or more players to join into a game from their respective computers connected to the internet;
   arranging and displaying all of the players on a game play area to computer monitors of each of the players;
   initially choosing two players randomly and displaying web camera images of the two players in a chosen player gamespace on each of the computer monitors of each of the players;
   displaying, on the computer monitors of each of the players, a trivia question; and
   awarding points to the player, from the two players randomly chosen, that answers the trivia question correctly or allocating a strike to the player that answers the trivia question incorrectly and displaying awarded points or allocated strikes on the computer monitors of each player; wherein
   the player that answers the trivia question correctly remains as one of two players and choosing an opponent player randomly from remaining players; and
   the game play area is broadcast, either live or as a pre-recorded output, to a television audience.

9. The method of claim 8, further comprising:
   granting the player points for answering the question correctly; and
   placing the same value of points into a jackpot when the player answers the question correctly.

10. The method of claim 9, further comprising:
    eliminating a player from the game when a predetermined number of strikes are received by the player; and
    placing any points earned by the eliminated player into the jackpot.

11. The method of claim 9, further comprising:
    continuing play until only one player remains; and
    permitting the one remaining player to play a bonus round, the bonus round adapted to allow the one remaining player to earn bonus points.

12. The method of claim 8, further comprising:
    controlling the game via a host appearing on each player's screen, wherein the host is live or animated.

13. The method of claim 8, wherein the game is televised simultaneously with the game being played over the internet.

* * * * *